United States Patent
Murray

[11] 3,936,012
[45] Feb. 3, 1976

[54] HANG GLIDER
[76] Inventor: Stephen C. Murray, 33871 El Encanto, Dana Point, Calif. 92629
[22] Filed: May 3, 1974
[21] Appl. No.: 466,682

[52] U.S. Cl. .......................... 244/16; 244/DIG. 1
[51] Int. Cl.² ................................. B64C 31/02
[58] Field of Search ............. 244/16, 153, 154, 155, 244/43, 46; 46/79, 80; D12/71; D34/15 HH, 15 AF; 403/59

[56] References Cited
UNITED STATES PATENTS

| | | | |
|---|---|---|---|
| 881,837 | 3/1908 | Whitehead | 244/16 X |
| 1,984,229 | 12/1934 | Neary | D34/15 AF X |
| 3,135,482 | 6/1964 | Girard | 244/43 |
| 3,140,842 | 7/1964 | Craigo et al. | 244/46 |
| 3,796,399 | 3/1974 | Wechsler | 244/DIG. 1 |

FOREIGN PATENTS OR APPLICATIONS
1,546,780  10/1968  France .................. 244/153 R OTHER PUBLICATIONS
Frank G. Kelly, "Flexi-Flyer", Apr. 1974, pp. 21–24, *American Aircraft Modeler*.

Paul Wahl, "Hang Gliders", June, 1972, pp. 92–94 and 130, *Popular Science*.

*Primary Examiner*—Trygve M. Blix
*Assistant Examiner*—Gale L. Barefoot
*Attorney, Agent, or Firm*—Gordon L. Peterson

[57] ABSTRACT

A device capable of flight comprising a frame including first and second leading edte members, a keel interconnected to the leading edge members, a first cross member attached to the keel and to the first leading edge member, and a second cross member attached to the keel. The second cross member is attached to the second leading edge member by a collar slidably mounted on the second cross member. A sail of flexible material is attached to the frame. The position of the collar along the second cross member can be adjusted to vary the billow of the sail.

14 Claims, 5 Drawing Figures

HANG GLIDER

BACKGROUND OF THE INVENTION

A hang glider typically includes a frame, a sail of flexible material attached to the frame, and a support attached to the frame. In use, the pilot holds the support and is able, by proper use of the hang glider, to soar through the air.

The frame of one hang glider includes leading edge members, a keel, and cross members attached to the keel and the leading edge members. Each of the cross members comprises telescoping tubes and one problem with this construction is that the telescoping tubes, for given metal thicknesses, are not as strong as desired. Moreover, the telescoping tubes inherently provide for some lack of rigidity of the cross members.

SUMMARY OF THE INVENTION

The present invention provides a hang glider which is much more versatile than prior art hang gliders and which has a significantly improved cross member construction. One feature of the present invention is the elimination of the telescoping tubes in favor of an integral cross member and a connector mounted for movement on the integral cross member. This increases the strength and rigidity of the cross member while simplifying construction. The connector is used, among other things, for attaching an associated leading edge member to the cross member.

One way in which the present invention increases versatility of the hang glider is that means is provided for adjusting the billow of the sail. A billow adjustment is desirable in order to permit the user to tailor the hang glider for different wind conditions. Billow adjustment can advantageously be obtained by providing means for retaining the connector at any one of a plurality of locations along the cross member. Thus, as the connector is moved along the cross member, the billow of the sail is changed.

The connector also provides versatility in that it permits adjustment of the dihedral, i.e., the angle formed by the cross member and a reference line. This can advantageously be accomplished by providing a flexible element coupled at one end to the support or to the frame. The other end of the flexible element is coupled to any one of a plurality of locations along the connector. Thus, by changing the location of the attachment of the flexible element to the connector, the dihedral can be adjusted.

Although the connector is used for obtaining both billow and dihedral adjustment, it is possible to change the billow while leaving the dihedral unchanged or to change the dihedral while leaving the billow unchanged. For example, if the connector is moved to a new location to adjust the billow, a corresponding change can be made with respect to the location of the attachment of the flexible element to the connector so as to maintain the same dihedral.

The present invention may also utilize a flexible element such as a cable to at least assist in supporting each of the cross members against downward bending loads. When this support system is used, one end of the cable is attached to a riser. The riser is in turn attached directly to the cross member and not to the leading edge member or to the connector. This provides several advantages. For example, with the riser connected to the cross member, the position of the connector along the cross member can be adjusted to adjust the billow, and this does not affect the position of the riser or the tension in the supporting cable. In other words, adjusting the billow has no effect on, nor does it require any changes in, the riser and associated cable system. In addition, a stronger frame is provided if the riser is attached directly to the cross member.

The slidable connector and the riser-cable system defined above coact to provide a further advantage. In collapsing the hang glider for transport and storage, the cross members are pivoted relative to the keel while the connectors move inwardly along their respective cross members toward the keel. The pivot arm formed by each of the cross members is of approximately the same length as the pivot arm formed by each of the cables connected to the risers. Thus, the cables remain relatively taut as the hang glider is being collapsed. Because the cables are maintained in a relatively taut condition during collapse of the hang glider, they are operative during the collapsing operation to support the associated cross members against downward bending loads which would be imposed by any down draft on the sail. Thus, the connector and riser coact to facilitate collapsing the hang glider under down draft conditions and guard against possible damage to the frame as a result of the down draft.

The connector can take different forms and may be mounted either externally or internally of the associated cross member. In a preferred construction, the connector is in the form of an axially short collar mounted externally of the cross member for sliding movement therealong. An appropriate bearing is carried by the collar and forms a portion thereof to facilitate the sliding motion of the collar.

The invention can best be understood by reference to the following description taken in connection with the accompanying illustrative drawing.

DESCRIPTION OF THE PREFERRED EMBODIMENT

Figure 1:
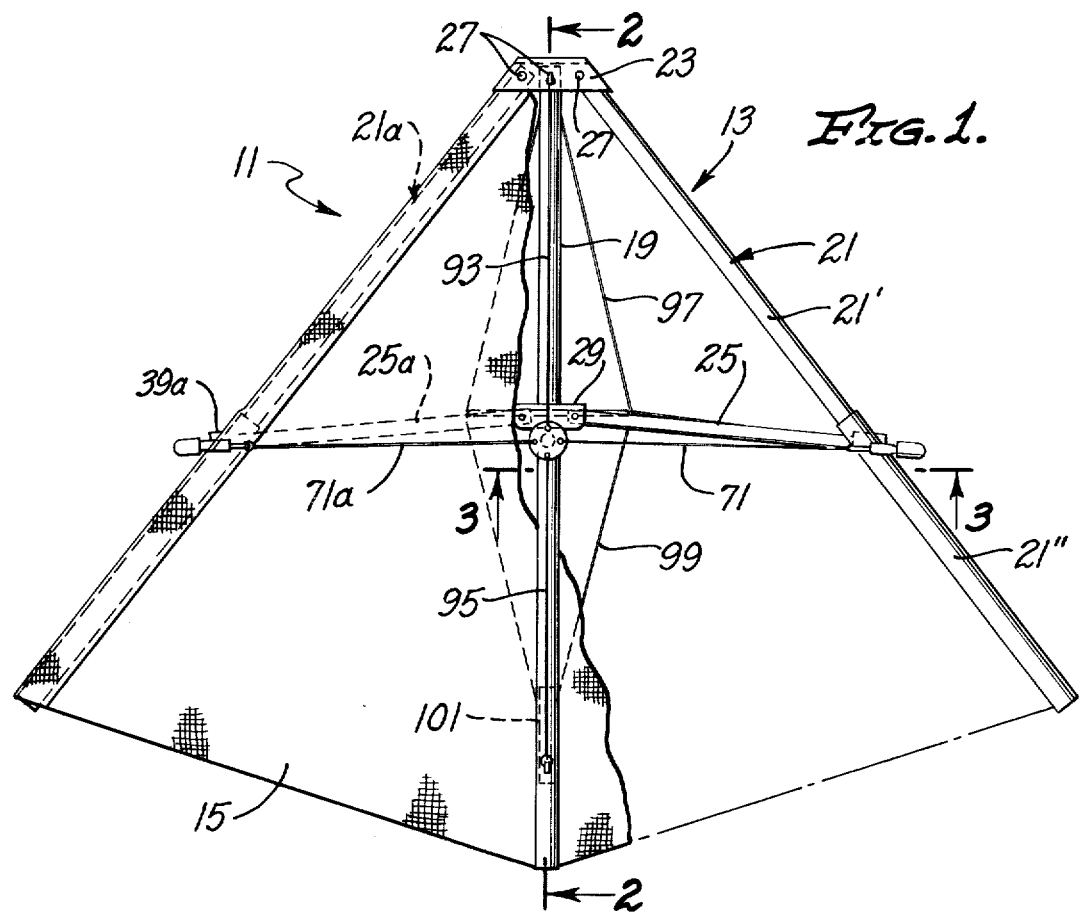
FIG. 1 is a top plan view, with portions of the sail broken away, of a hang glider constructed in accordance with the teachings of this invention.

FIG. 1 shows a hang glider 11 constructed in accordance with the teachings of this invention. The hang glider 11 generally includes a frame 13, a sail 15 of flexible material suitably carried by the frame, and a support in the form of a control bar 17 (FIGS. 2 and 3) pendulously mounted on the frame.

The frame 13 includes a keel 19, identical leading edge members 21 and 21a interconnected to the keel by a nose block 23, and identical cross members 25 and 25a. The keel 19, the leading edge members 21 and 21a and the cross members 25 and 25a are preferably lightweight structural members and may be, for example, cylindrical tubing constructed of aluminum or an aluminum alloy.

Figure 2:
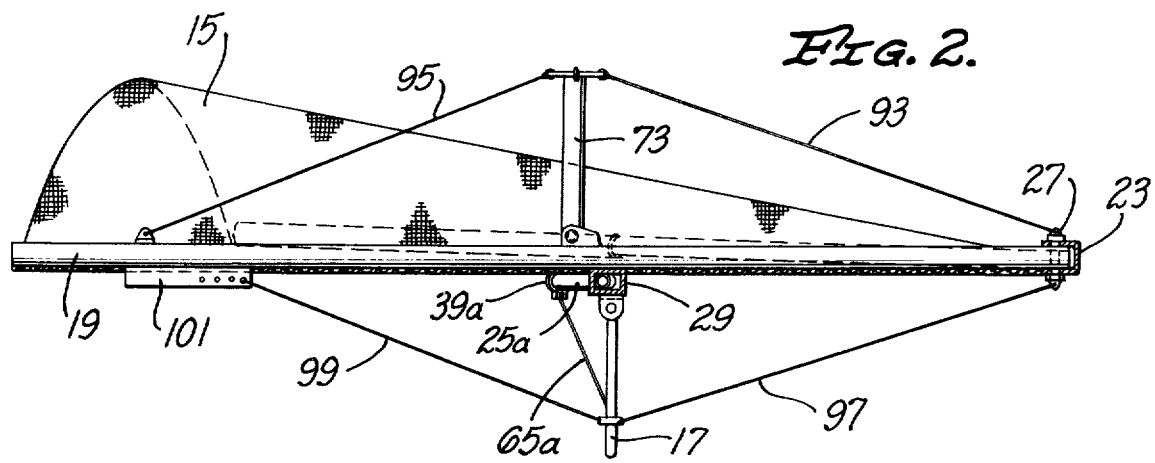
FIG. 2 is a sectional view taken generally along line 2—2 of FIG. 1.

The nose block 23 serves the function of pivotally interconnecting the keel 19 and the leading edge members 21 and 21a. Although this function could be carried out in many different ways, in the embodiment illustrated, the nose block 23 is generally of channel-shaped cross section as shown in FIG. 2, and the keel 19 and the leading edge members 21 and 21a are pivotally attached to the flanges of the web-shaped cross section of the nose block 23 in any suitable manner such as by threaded fasteners 27. In this manner, the keel 19 and the leading edge members 21 and 21a are mounted for pivotal movement relative to each other in the same plane about parallel axes extending perpendicular to such plane.

Figure 3:
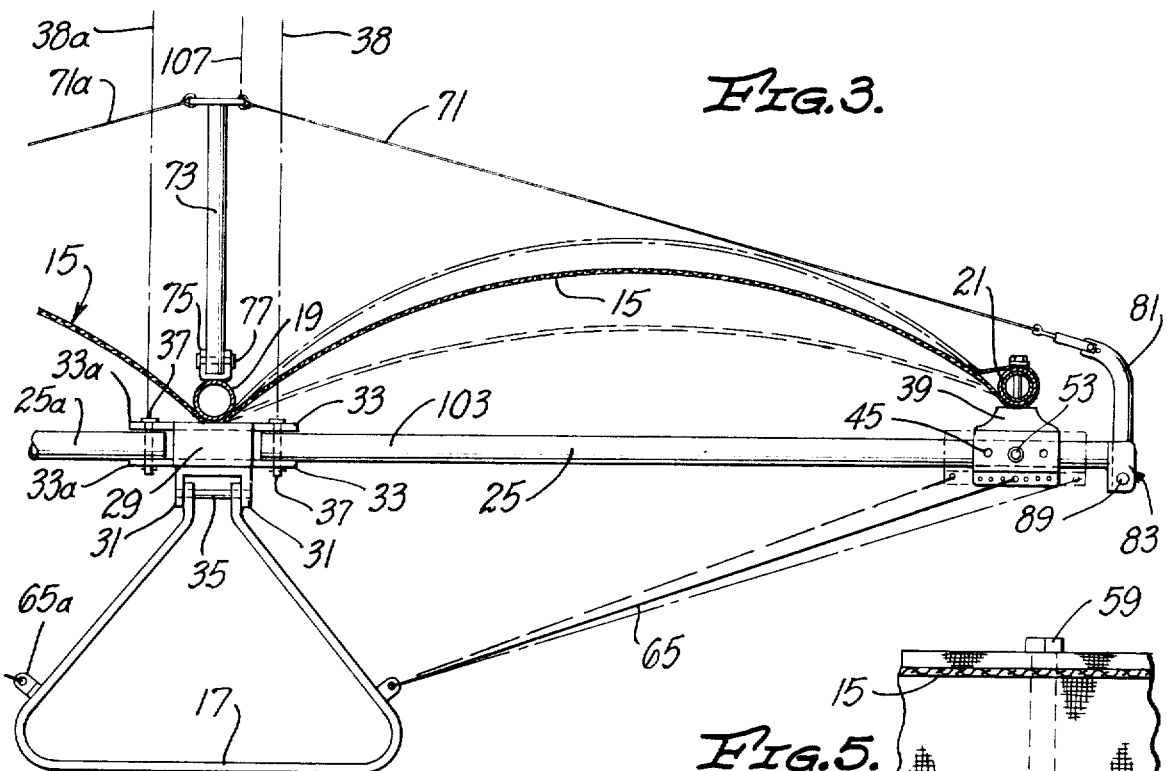
FIG. 3 is an enlarged, fragmentary, sectional view taken generally along line 3—3 of FIG. 1.

The frame 13 also includes a cross member block 29 (FIGS. 1–3) suitably fixedly attached to the underside of the keel 19 as by bolts (not shown). The cross member block 29 serves to attach the control bar 17 and the cross members 25 and 25a to the keel 19. Although these functions can obviously be carried out in different ways, in the embodiment illustrated, the block 29 is of hollow rectangular cross section as shown in FIG. 2 and includes depending flanges 31 and oppositely extending lateral flanges 33 and 33a. The control bar 17 is suitably pivotally attached to the flanges 31 as by a threaded fastener 35 and the cross members 25 and 25a are suitably pivotally attached to the flanges 33 and 33a, respectively, by fasteners 37 and 37a to define pivot axes 38 and 38a (FIG. 3). The pivot axes 38 and 38a of the cross members 25 and 25a are generally parallel to the pivot axes defined by the fasteners 27 and transverse to the pivot axis for the control bar 17. The cross members 25 and 25a are relatively loosely attached to the flanges 33 and 33a, respectively, to thereby permit some tilting of the cross members in a vertical plane as viewed in FIG. 3. The control bar 17 could be of various configurations; however, in the embodiment illustrated, it is of generally triangular configuration as shown in FIG. 3.

The leading edge members 21 and 21a are attached to the cross members 25 and 25a, respectively, by identical connectors 39 and 39a. As the connectors 39 and 39a are identical, only the connector 39 is described in detail herein.

Figure 4:
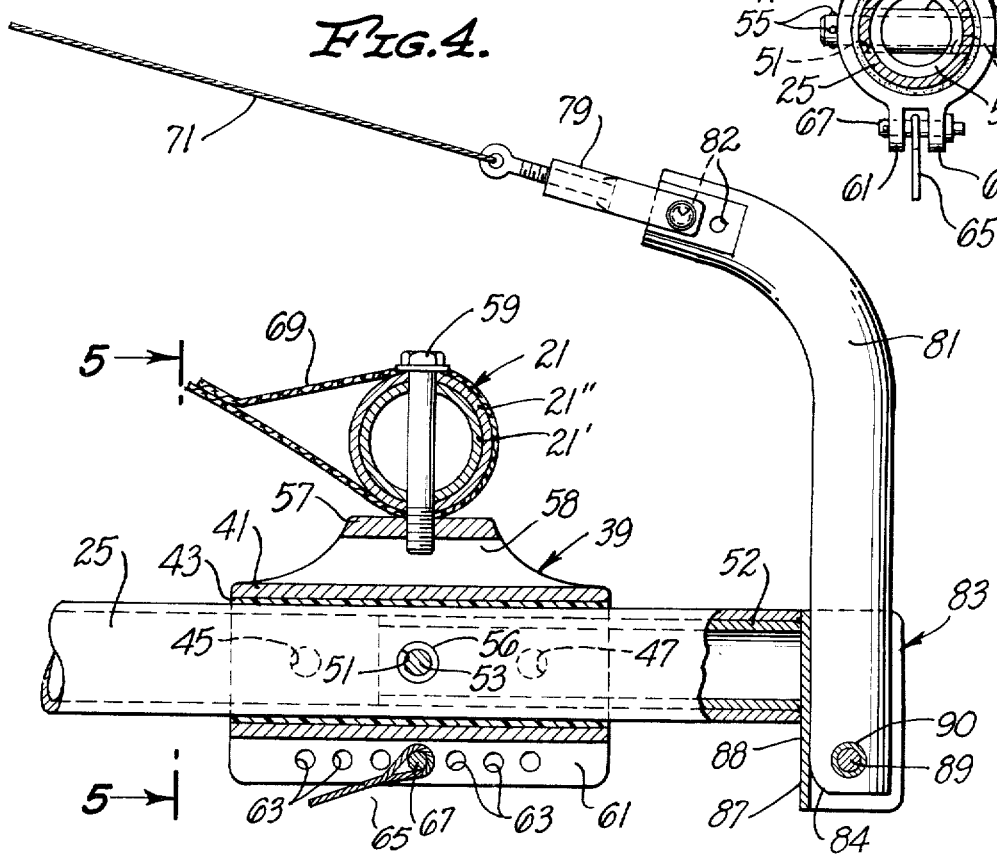
FIG. 4 is an elevational view partially in section illustrating on a larger scale the construction shown at the righthand end of FIG. 3.

The connector 39 (FIGS. 3–5) can take various forms which are suitable for performing the functions noted herein. In one preferred form, the connector 39 is in the form of a collar and includes an outer sleeve 41 and a sleeve bearing 43 attached to the outer sleeve and constructed of a suitable plastic material. The connector 39 is slidable along the cross member 25 between an extended position near the outer end of the cross member and a collapsed position adjacent the inner end of the cross member with the bearing 43 facilitating such sliding movement.

Figure 5:
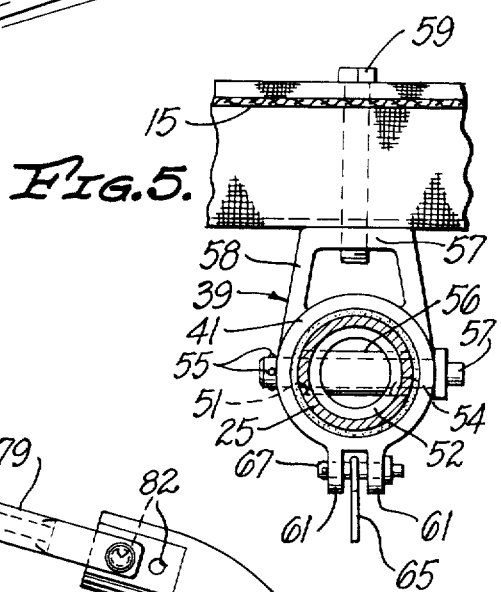
FIG. 5 is a fragmentary, sectional view taken generally along line 5—5 of FIG. 4.

The precise location of the connector 39 in the extended position can be adjusted. Although this can be carried out in many different ways, in the embodiment illustrated, the connector 39 has three axially spaced pairs of apertures 45, 47, and 49 and the cross member 25 has one aligned pair of apertures 51 (FIG. 5). A stem 52 of tubular construction having aligned aperture 54 aligned with the apertures 51 is received within the cross member 25 for a purpose described below. The stem 52 is affixed to the cross member 25 by a bushing 56 which extends through the apertures 54 and into the aperture 51. A pin 53 extends through the apertures 49 and the bushing 56 to releasably retain the connector 39 in a selected one of the positions. Although the pin 53 may take different forms, in the embodiment illustrated, it includes a plunger 57 for operating detents 55 (FIG. 5) in a known manner. The detents 55 retain the pin 53 within the selected apertures. To change the position of the connector 39 along the cross member 25, the plunger 57 is actuated to release detents 55 to permit withdrawal of the pin 53. The connector 39 is then moved to bring the apertures 45 or 47 into registry with the bushing 56 whereupon the pin 53 is reinserted to fix the connector in the newly selected position.

The leading edge member 21, in the embodiment illustrated, includes telescoped tubes 21' and 21" attached in any suitable way to each other and to the connector 39. In the embodiment illustrated, the connector 39 includes a hollow section 58 (FIG. 5) and the tubes 21' and 21" of the leading edge member 21 are affixed to each other and to the hollow section by a threaded fastener 59.

The connector 39 also includes spaced parallel flanges 61 having aligned pairs of apertures 63 extending therethrough. A flexible element in the form of a cable 65 is attached at one end to the control bar 17 and at the other end to a detented cable pin 67 (FIG. 5) which may embody the same plunger actuator detent features as the pin 53. The cable pin 67 may be inserted through any one of the apertures 63 for a purpose described hereinbelow.

The said 15 is in the form of an appropriately configured sheet and may be constructed of any suitable flexible material commonly used for this purpose in devices of this kind. Similarly, the sail 15 may be attached to the frame 13 in any suitable manner. In the embodiment illustrated, the leading edges of the sail are formed into a loop 69 (FIG. 4) and the leading edge members 21 and 21a are inserted through the loop 69, respectively. The sail is suitably affixed to the keel 19. When mounted in this fashion, the sail 15 is loosely draped between each of the leading edge members 21 and 21a and the keel so that when the sail is exposed to the wind it can billow and form two arcuate panels.

Flexible elements in the form of cables 71 and 71a are used to support the cross members 25 and 25a, respectively, against bending loads. A mast 73 is suitably pivotally connected to the keel 19 as by a bracket 75 and pin 77 and the inner ends of the cables 71 and 71a are affixed to the upper end of the mast. The outer end of cable 71 is attached to a turnbuckle 79 which in turn is pivotally attached to a curved riser 81 at any one of a plurality of apertures 82. A cutout section 82' of the riser 81 permits the turnbuckle 79 to be pivoted downwardly when the cable 71 is disconnected. The lower end of the riser 81 is pivotally attached to the outer end of the cross member 25 by a coupling 83 and has a curved radius 84. In the embodiment illustrated, the coupling 83 includes the stem 52, the riser 81, and a channel section 87 having a web 88. The lower end of the riser 81 is pivotally attached to the channel section 87 by a bushing 90 and a pin 89. The outer end of the cable 71 is attached to the cross member 25a in an identical manner.

The mast 73 also supports the inner ends of cables 93 and 95 (FIG. 2), and the outer ends of these cables are suitably attached to the keel 19 adjacent the forward and rearward ends thereof. This supports the keel 19 against downward bending loads.

The cables 65 and 65a support the cross members 25 and 25a, respectively, against upward bending loads. Cables 97 and 99 (FIG. 2) extend from the control bar 19 and are attached to the keel 19 adjacent the forward and aft ends thereof, respectively, to support the keel against upward bending loads. The cable 99 is attached to the keel 19 by a rear cable channel 101 which permits the location of the attachment of the cable 99 to the keel 19 to be adjusted longitudinally of the keel.

With the hang glider 11, the billow of the sail 15 may be either low as shown by the dashed lines in FIG. 3, normal as shown by the full lines in FIG. 3, or high as shown by the phantom lines in FIG. 3. For low billow, the pin 53 is removed and the connector 39 is moved outwardly on the cross member 25 until the apertures 45 are aligned with the apertures 51 and 54 whereupon the pin 53 is inserted through these aligned apertures. Conversely, for high billow, the connector 39 is moved inwardly to align the apertures 47 with the apertures 51 and 54. Although three billow positions have been shown, obviously other numbers of billow positions may be provided, if desired.

The dihedral can be varied by changing the position of the attachment of the cable pin 67 to the connector 39. The dihedral is the angle between a reference line 103 and the axis of either of the cross members 25 or 25a. To change the dihedral, the cable pin 69 is moved to another one of the apertures 63.

It will be apparent that the dihedral can be changed without effecting any corresponding change in the billow. However, because changing the billow involves moving of the connector 39 along the cross member 25, any change in the billow will result in a corresponding change in the dihedral unless the cable pin 67 is moved to an appropriate new set of apertures 63.

The riser 81 is mounted directly on the cross member 25 by the coupling 83 outboard of the connector 39. The riser 81 supports the outer end of the cable 71 at a sufficient height so that even at high billow the sail 15 does not contact the cable 71.

In the position shown in the drawings, the hang glider 11 is in an extended position ready for flight. However, the hang glider 11 can be collapsed for transport and storage. This can be accomplished by removing the pins 53 of the connectors 39 and 39a and pivoting the leading edge members 21 and 21a inwardly toward the keel. This in turn pivots the cross members 25 and 25a counterclockwise and clockwise, respectively, as viewed in FIG. 1 with the connectors 39 and 39a sliding inwardly toward the keel on their respective cross members.

The cables 71 and 71a are maintained in a relatively tight condition during the collapsing of the hang glider 11. In this connection, the cross member 25 pivots about the axis 38 and the cable 71 pivots about an axis 107. As shown in FIG. 3, the axes 38 and 107, while not coincident, are very closely adjacent. Thus, as the riser 81 pivots with the cross member 25 about the axis 38, the cable 71 is maintained relatively taut. Accordingly, it can support the cross member 25 against downward bending loads such as may result from a down draft on the sail 15 during the collapsing operation. The cable 71a functions in an identical manner during the collapsing operation. With the hang glider 11 collapsed, the radius 84 (FIG. 4) on the riser 81 permits the riser to be pivoted clockwise in channel section 87 until the lower end of the riser abuts the web 88. This occurs when the riser 81 has pivoted through about 90°. If the cable 93 is disconnected, the mast 73 may be pivoted to a collapsed position.

Although exemplary embodiments of this invention have been shown and described, many changes, modifications and substitutions may be made by those with ordinary skill in the art without necessarily departing from the spirit and scope of this invention.

I claim:

1. A device capable of flight comprising:

a frame including first and second leading edge members, a keel, and means for interconnecting said leading edge members to said keel in a manner to allow the leading edge members to be pivoted relative to said keel;

said frame including first and second cross members, means for attaching said first and second cross members to said keel to allow said cross members to pivot relative to said keel, and means for attaching the first leading edge member to the first cross member;

said second cross member being of integral construction;

said frame including connector means for coupling the second leading edge member to the second cross member;

said connector means being mounted for movement along said second cross member from an extended position toward the keel to facilitate at least partial collapse of the frame;

said second cross member extending beyond both ends of said connector means at least when the connector means is in the extended position;

means for retaining the cross member in said extended position; and flexible material coupled to said leading edge members and forming a relatively broad surface to at least assist in supporting the device when the device is airborne.

2. A device as defined in claim 1 including a riser coupled to said second cross member outboard of said connector means and means coupled to said riser for at least assisting in supporting said second cross member against predetermined bending loads.

3. A device as defined in claim 1 wherein said extended position includes a plurality of positions along said second cross member and said retaining means retains said connector member in any one of said plurality of positions whereby the billow of the flexible material can be varied.

4. A device as defined in claim 1 wherein said connector means includes a collar mounted on said second cross member for movement therealong, said collar including an outer sleeve to which the second leading edge member is attached and a bearing within said outer sleeve to facilitate movement of said collar along said second cross member.

5. A device as defined in claim 4 including a riser coupled to said second cross member outboard of said collar and means coupled to said riser for at least assisting in supporting said second cross member against predetermined bending loads, said extended position includes a plurality of positions along said second cross member and said retaining means retains said collar in any one of said plurality of positions whereby the billow of the flexible material can be varied.

6. A device capable of flight comprising:

a frame including first and second leading edge members, a keel, means for interconnecting said leading edge members to said keel so as to allow the leading edge members to be pivoted relative to said keel;
said frame including first and second cross members, means for attaching said first and second cross members to said keel to allow said cross members to pivot relative to said keel, and means for attaching the first leading edge member to the first cross member;
said frame including connector means for coupling the second leading edge member to the second cross member;
said connector means being mounted for movement along said second cross member from an extended position toward the keel to facilitate at least partial collapse of said frame;
flexible material coupled to said leading edge members and forming a relatively broad surface to at least assist in supporting the device when the device is airborne;
said extended position including a plurality of positions along said second cross member;
retaining means for fixedly retaining said connector means in any one of said plurality of positions whereby the billow of the flexible material can be selected; and
said connector means including a collar mounted for sliding movement along said second cross member, said second leading edge member being attached to said collar.

7. A device as defined in claim 6 including means attached to said frame for at least assisting in supporting a human occupant of the device, a flexible element coupled to said last mentioned means, and means for coupling said flexible element to said connector means at any one of a plurality of locations along said connector means whereby the dihedral can be adjusted.

8. A device as defined in claim 6 including a riser coupled to said second cross member outboard of said connector means and means coupled to said riser for at least assisting in supporting said second cross member against predetermined bending loads.

9. A device capable of flight comprising:
a frame including first and second leading edge members, a keel, and means for interconnecting said leading edge members to said keel so as to allow the leading edge members to be pivoted relative to said keel;
said frame including first and second cross members, means for attaching said first and second cross members to said keel to allow said cross members to pivot relative to said keel, and means for attaching the first leading edge member to the first cross member;
said frame including a collar slidably mounted on said second cross member;
means for coupling the second leading edge member to the collar;
said collar being slidable along said second cross member from an extended position toward the keel to facilitate at least partial collapse of the frame;
means for retaining said collar in said extended position; and
flexible material coupled to said leading edge members and forming a relatively broad surface to at least assist in supporting the device when the device is airborne.

10. A device capable of flight comprising:
a frame including first and second leading edge members, a keel, and means for interconnecting said leading edge members to said keel so as to allow the leading edge members to be pivoted relative to said keel;
said frame including first and second cross members, means for attaching said first and second cross members to said keel to allow said cross members to pivot relative to said keel, and means for attaching the first leading edge member to said first cross member;
a connector mounted on said second cross member for coupling the second leading edge member to the second cross member;
said connector being mounted for movement along said second cross member from an extended position toward the keel to facilitate at least partial collapse of said frame;
means for retaining said connector in said extended position;
a riser coupled to said second cross member outboard of said connector;
means coupled to said riser for at least assisting in supporting said second cross member against predetermined bending loads; and
flexible material coupled to said leading edge members and forming a relatively broad surface to at least assist in supporting the device when the device is airborne.

11. A device as defined in claim 10 wherein said connector includes a collar slidably mounted on said second cross member.

12. A device as defined in claim 10 wherein said last mentioned means includes a mast and a cable coupled to the mast and riser, said cable and said second cross member being pivotable about first and second axes, respectively, said first and second axes being closely adjacent.

13. A device as defined in claim 9 including a mast attached to said keel, a flexible element having first and second spaced regions, said first region being attached to said mast, and means other than said second leading edge member for attaching the second region to the second cross member.

14. A device capable of flight comprising:
a frame including first and second leading edge members, a keel, and means for interconnecting said leading edge members to said keel so as to allow the leading edge members to be pivoted relative to said keel;
said frame including first and second cross members, means for attaching said first and second cross members to said keel to allow said cross members to pivot relative to said keel, and means for attaching the first leading edge member to said first cross member;
a connector mounted on said second cross member for coupling the second leading edge member to the second cross member;
said connector being mounted for movement along said second cross member from an extended position toward the keel to facilitate at least partial collapse of said frame;
means for retaining said connector in said extended position;
a mast attached to said keel;
a flexible element having first and second spaced regions, said first region being attached to said mast;

means other than said second leading edge member for attaching said second region to the second cross member outboard of said connector; and flexible material coupled to said leading edge members and forming a relatively broad surface to at least assist in supporting the device when the device is airborne.

* * * * *